Oct. 11, 1949.  E. C. WHITNEY  2,484,260
FLYWHEEL MOTOR-GENERATOR CONTROL
Filed Feb. 24, 1947
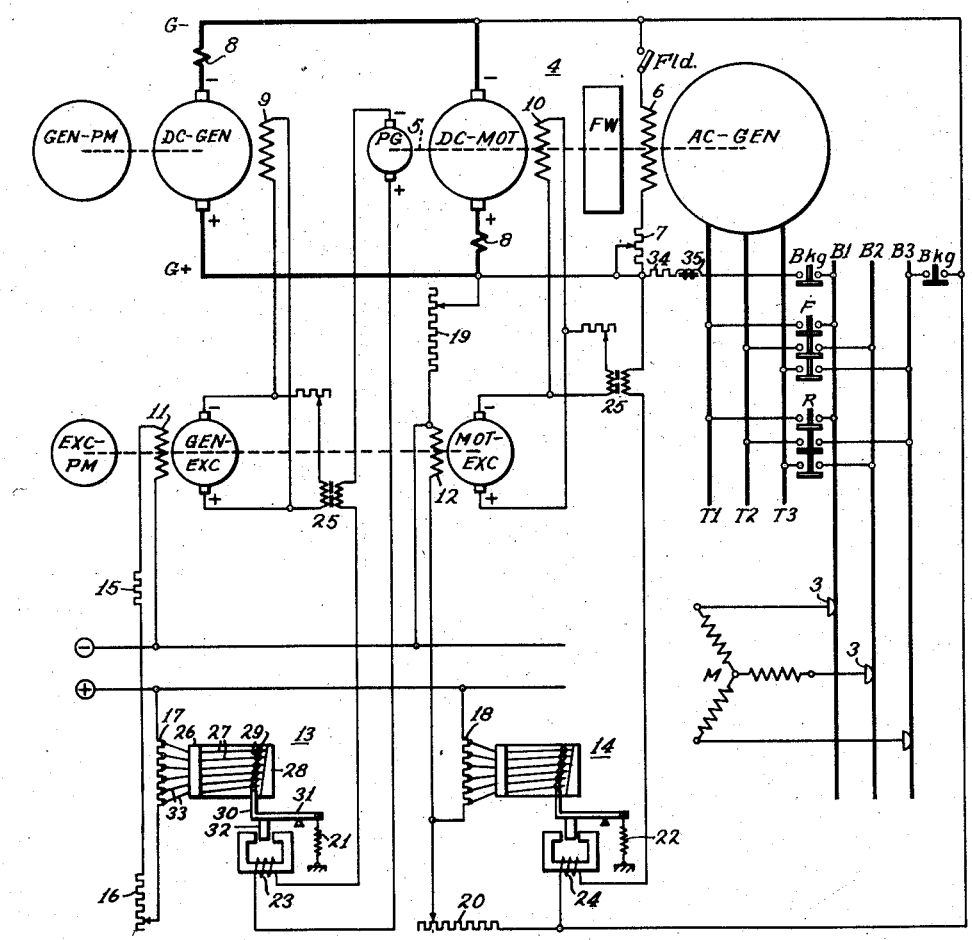
WITNESSES:
Edward Michaels
Wm. L. Groome
INVENTOR
Eugene C. Whitney.
BY O. B. Buchanan
ATTORNEY Patented Oct. 11, 1949

2,484,260

UNITED STATES PATENT OFFICE 2,484,260

FLYWHEEL MOTOR-GENERATOR CONTROL

Eugene C. Whitney, Pittsburgh, Pa., assignor to Westinghouse Electric Corporation, East Pittsburgh, Pa., a corporation of Pennsylvania Application February 24, 1947, Serial No. 730,322

5 Claims. (Cl. 318—150)

My invention relates to flywheel motor-generator sets, in which the motor of the set is a direct-current motor, energized by a constantly connected direct-current generator. More particularly, my invention relates to a power-plant having such a flywheel motor-generator set for supplying power for an electric catapult, of the type shown in an application of Maurice F. Jones, Serial No. 737,647, filed March 27, 1947, for launching aircraft, and featuring the application of polyphase power for energizing a polyphase-motored shuttle-car during its plane-launching accelerating-run, and the application of direct-current power to two or more terminals of the polyphase motored car for braking the same to standstill after the accelerating run, either with or without the previous use of reverse-phase-sequence, or plug-reversal, excitation of the polyphase-motored car before the application of the direct-current braking-power. The Jones application just mentioned relates, in turn, to an improvement in the electric towing-car (or shuttle-car) catapult which is described and claimed in patent of Frank B. Powers, No. 2,404,984, granted July 30, 1946. Both the Jones application and the Powers patent are assigned to the Westinghouse Electric Corporation.

In the operation of my catapult-energizing power-plant, an important feature is the necessity for taking a large block of direct-current power from the direct-current generator for exciting the polyphase generator of the flywheel motor-generator set, during the polyphase energization of the shuttle-car; and the further necessity for taking another large block of direct-current power from the direct-current generator for braking the shuttle-car. The polyphase generator is rated for intermittent operation, and it is much larger than the direct-current machines, because most of the polyphase power for operating the catapult during its brief runs is taken from the stored kinetic energy of the flywheel. In order to obtain predictable, and exactly repeating, performances of the catapult, under such conditions, it is necessary to maintain an exact voltage on the direct-current generator, and to maintain a reasonably exact initial-speed of the flywheel-set.

An object of my invention is to utilize two voltage-regulators in the unusual sense of having a constant-voltage regulator, controlling the field of the direct-current motor, for maintaining a constant voltage on the direct-current generator, and having a speed-regulator, controlling the field of the direct-current generator, for maintaining, or trying to maintain, a constant speed of the flywheel-set.

With the foregoing and other objects in view, my invention consists in the systems, combinations, parts and operations hereinafter described and claimed, and illustrated in the accompanying drawing, the single figure of which is a simplified diagrammatic view of circuits and apparatus illustrating my invention in a preferred form of embodiment.

The catapult is illustrated, schematically, in its barest essentials, by means of a track-and-thirdrail system B1, B2, B3, to which the polyphase-motored shuttle-car M is constantly connected by means of current-collector shoes 3. As shown in the previously mentioned Powers patent, the shuttle-car M carries the three-phase primary winding of a polyphase linear motor, the second winding of which (not shown) is spread out along the track.

The power-plant for energizing the catapult comprises a generator-driving prime-mover GEN-PM, preferably having a substantially constant speed, and a direct-current generator DC-GEN, driven thereby. The direct-current generator DC-GEN has generator-terminals G+ and G− which are constantly connected to the direct-current motor DC-MOT of a motor-generator set 4 having a large three-phase generator AC-GEN, a large flywheel FW, and a pilot-generator PG, all mounted on the shaft 5 of the direct-current motor DC-MOT.

The polyphase generator AC-GEN has three-phase terminals T1, T2 and T3, which may be connected to or disconnected from the motor-buses B1, B2 and B3, in either phase-sequence, by the main contacts of forward- and reverse-contactors F and R, respectively.

The polyphase generator AC-GEN also has a field-winding 6, which may be connected across the direct-current generator-terminals G+ and G− through a field-switch Fld and a variable field-resistance 7.

The two direct-current machines DC-GEN and DC-MOT each have just enough series field 8 to stabilize them, and they each have a field-winding, 9 and 10, respectively, which is energized from a separate exciter, GEN-EXC and MOT-EXC, respectively. The two exciters are driven from a prime-mover EXC-PM.

The two exciters GEN-EXC and MOT-EXC have field-windings, 11 and 12, respectively, which are excited from a direct-current bus (+) and (−), through voltage-regulators 13 and 14 respectively. The circuit of the field-winding 11 of the generator-exciter GEN-EXC also contains a fixed resistance 15, and a manually controlled rheostat 16, in addition to the regulator-controlled resistance 17 which is controlled by the regulator 13. The field-winding 12 of the motor-exciter has two exciting-circuits, in the illustrated form of embodiment; the main exciting-circuit containing the regulator-controlled resistance 18 which is controlled by the regulator 14, and being energized from the direct-current bus (+) and (—); while the other exciting-circuit of the motor-exciter field-winding 12 supplies a negative or bucking-excitation from the direct-current generator-terminals G+ and G—, through two large adjustable resistances 19 and 20, respectively. This bucking-excitation is one of several known expedients for increasing the effective range of the associated voltage-regulator 14, by reducing the field-current of the motor-exciter MOT-EXC, so that it is possible to maintain a lower excitation than the exciter-characteristic would otherwise be suitable for.

The two voltage-regulators 13 and 14 may be any sort of regulators having a biasing-means, such as a spring 21 or 22, for biasing the regulator toward a position in which practically all of the regulator-controlled resistance, 17 or 18, is cut out; and having a voltage-coil, 23 or 24, as the case may be, for moving the regulator toward a position in which all of the regulator-controlled resistance, 17 or 18, is in the circuit of its associated field-winding 11 or 12. The voltage-coil 23 of the regulator 13 for the generator-exciter GEN-EXC is energized from the pilot-generator PG, which develops a voltage proportional to the speed of the flywheel motor-generator set. The voltage-coil 24 of the regulator 14 for the motor-exciter MOT-EXC is energized from the direct-current generator-terminals G+ and G—. Both regulators 13 and 14 are provided with the usual damping-transformer 25, or other anti-hunting means.

In the particular form of embodiment illustrated, both of the regulators 13 and 14 are of the well-known type, known as a Silverstat, in which an insulating block 26 rigidly holds a plurality of spaced leaf-springs 27, the ends of which may contact against a suitable insulating stop 28. The blades or springs 27 carry silver contact-buttons 29, which are pressed together by the end 30 of a balance-beam 31, under the influence of the biasing-spring 21 or 22, as the case may be. The spring-force is balanced against the pull of an armature 32, which is carried by the balance-beam, and which is attracted by the magnetic field of the voltage-coil 23 or 24, as the case may be. The back ends of the blades or springs 27 are electrically connected, at 33, to successive sections of the associated regulator-controlled resistance, 17 or 18.

In addition to the foregoing equipment, the apparatus includes two braking-contactors Bkg for connecting the direct-current generator-terminals G+ and G— to a plurality or conductors of the track-system, such as the buses B1 and B3, respectively. The braking-circuit preferably includes a resistance 34 for limiting the braking-current to a desired value, and a choke-coil 35 for limiting the rate of rise of current, upon the application of the direct-current braking-power, and thereby protecting the direct-current generator DC-GEN from excessive voltage-stresses, or possible flashover at the commutators.

In operation, when the flywheel-set is first being started from standstill, the voltage-regulators 13 and 14 both have all of their resistances 17 and 18 cut out, and the manually regulated rheostat 16 is adjusted to full resistance. The exciter-prime-mover EXC-PM may then be started, putting full field on the direct-current motor DC-MOT of the flywheel-set, and putting a very weak field on the direct-current generator DC-GEN, due to the resistance 16. The generator-prime-mover GEN-PM is then brought up to speed, thus causing the direct-current generator DC-GEN to supply power to the direct-current motor DC-MOT, starting the flywheel-set. The hand-rheostat 16 may be adjusted to keep the output-current of the direct-current generator at its maximum or rated value, the resistance of this rheostat being gradually cut out as the speed of the flywheel-set gradually increases.

Just before all of the resistance of the hand-rheostat 16 is cut out, the voltage across the generator-terminals G+ and G— reaches very nearly its full rated value, and the motor-controlling regulator 14 automatically takes charge, by beginning to cut in its resistance 18, in the exciting-circuit of the motor-exciter MOT-EXC. The rest of the rheostat 16 may then be cut out, leaving the motor-controlling regulator 14 to so adjust the motor-field, and hence the load-current drawn by the motor, as to maintain a constant voltage on the generator-terminals G+, G—, which are also the motor-terminals.

By the time when the motor-controlling regulator 14 begins to take over, the flywheel motor-generator set will have reached a certain fraction of its full rated speed, say 60% thereof, and it will be still accelerating, under the full-power output of the direct-current generator DC-GEN, with maximum field on the generator. The fixed resistance 15 in the field-winding circuit of the generator-exciter GEN-EXC is so chosen, by the designer, that the generator-current will be at substantially its maximum rated value when all of the regulator-controlled resistance 17 is shortened out of the generator-exciter field. Since the direct-current generator DC-GEN is being driven at essentially a constant speed, by its prime-mover GEN-PM, it will be delivering its rated kilowatt-output as long as it is operating at its maximum field-excitation as fixed by the fixed resistance 15. Meanwhile, the flywheel-set is steadily accelerating, the motor-load being held, by the motor-controlling regulator 14, at such value that the generator-voltage remains constant at its maximum or rated value. Since the generator-output remains constant, so long as it is operating at constant speed and fixed excitation, and since the generator-voltage is held constant by the motor-controlling regulator 14, the generator-current (which is equal to the output divided by the voltage), remains constant.

The flywheel-set thus accelerates at the maximum rate, absorbing the full maximum output of the direct-current generator DC-GEN, until the flywheel-set reaches very nearly its full rated speed, for which the pilot-generator PG and the generator-controlling regulator 13 are set; whereupon the generator-controlling regulator begins to cut in its resistance 17, in the field-winding circuit of the generator-exciter GEN-EXC. When the generator-field is reduced, by this operation, the generator-output is reduced, and the generator-voltage is also momentarily very slightly reduced, so that the voltage-responsive regulator cuts out some of the motor-exciter field-resistance 18, thus increasing the motor-field and further reducing the current drawn by the motor. By these means, the accelerating power-input, into the flywheel-set, is reduced. These adjustments continue until the direct-current motor DC-MOT is drawing just enough load-current to supply the friction-losses in the flywheel-set, without either accelerating or decelerating the flywheel-set, and the direct-current generator DC-GEN has just enough field-excitation to maintain its full rated voltage at this load, with the flywheel-set operating at its full rated speed.

My power-plant is designed for intermittent duty, and specifically for furnishing power for an electric catapult for airplane-launchings. When a launching-operation is performed, the "forward" polyphase contactor F is closed, connecting the terminals T1, T2, T3 of the polyphase generator AC-GEN to the catapult motor-buses B1, B2, B3; and the field-switch Fld is closed, exciting the field-winding 6 of the polyphase generator AC-GEN from the direct-current generator-terminals G+ and G—. This throws a fairly heavy load on the direct-current generator, reducing its voltage and hence the power supplied to the direct-current motor DC-MOT, so that the speed of the flywheel-set begins to fall off. The field-flux of the polyphase generator AC-GEN quickly builds up, causing a smooth increase of the voltage of the polyphase generator, applying a very large block of power to the catapult-motor M, many times the rated power of either the direct-current generator DC-GEN or the direct-current motor DC-MOT; thus slowing down the flywheel-set and absorbing some of the stored kinetic energy of the flywheel FW. The speed-responsive regulator 13 quickly responds to the reduced flywheel-speed by cutting out all of its controlled resistance 17, thus causing the direct-current generator DC-GEN to deliver its maximum output; while the voltage-responsive regulator 14 constantly maintains the direct-current motor- or generator-voltage at its full, rated value, by increasing the motor-field, and hence reducing the load-current drawn by the direct-current motor DC-MOT, as much as may be needed to make the total direct-current load exactly equal to the output of the direct-current generator, and to keep the direct-current generator-voltage constant. Hence, since the direct-current generator DC-GEN is delivering its full, rated kilowatt-output, the motor-controlling regulator 14 adjusts the motor-load so that the sum of the motor-load, plus the load imposed by the polyphase-generator field-winding 6, shall just equal the rated output of the direct-current generator DC-GEN.

At the end of a brief accelerating-run of the catapult, during which time the airplane to be launched (not shown) is brought up to slightly over its launching-speed, the catapult shuttle-car (diagrammatically represented by the polyphase catapult-motor M) must be stopped. First, the forward-contactor F is opened, discontinuing the forward - phase - sequence power - supply to the catapult-motor M. Then, while leaving the field-switch Fld closed, the reverse-contactor R may be closed, to apply reverse-phase-sequence power to the polyphase catapult-motor M. When the catapult-motor M has been reduced to a low speed, in either the forward or reverse direction, the reverse-contactor R and the field-switch Fld are both opened, thus disconnecting the catapult from the polyphase generator AC-GEN, and also relieving the direct-current generator DC-GEN of the load imposed by the polyphase-generator field-winding 6.

Finally, direct-current braking is applied, briefly, to the polyphase catapult-motor M, by closing the braking-contactors Bkg for the required length of time, drawing a heavy block of direct-current power from the generator-terminals G+, G—, and bringing the catapult-motor M to standstill, after which the braking-contactors Bkg are opened. During all this time, no matter how much or how varied is the external load on the direct-current generator DC-GEN (other than the load-current of the continuously connected direct-current motor DC-MOT), the motor-controlling regulator 14 continuously adjusts the motor-field so that the motor-current makes up whatever difference may be needed to maintain a constant direct-current generator-voltage, and hence a constant current, or ratio of output to voltage (the output being constant, as previously explained).

After the braking-contactors Bkg are opened, the full output of the direct-current generator DC-GEN is absorbed by the motor DC-MOT of the flywheel-set, and the speed of the flywheel-set is brought up to normal, as described for the initial set-starting operation.

It will be noted that my novel speed- and voltage-responsive regulator-combination, for controlling the direct-current generator and motor, DC-GEN and DC-MOT, respectively, makes it possible to maintain a constant initial or idling speed of the flywheel motor-generator set, and also to maintain a constant voltage on the direct-current generator, so that (with a constant generator-speed) the output of the direct-current generator may be held at its constant rated value (except during the idling conditions), and so that the direct-current generator-voltage may be utilized to supply external loads (that is, the polyphase-generator excitation and the direct-current braking-power) under conditions which, because of the constancy of the voltage, may be accurately predicted and predetermined, as is necessary for successful catapult-operation.

After any accelerating-run, and the subsequent stopping, of the catapult shuttle-car M, it may be slowly brought back to the starting point by suitable control-means (not shown) which forms no part of my present invention.

The general features of the catapult-operation, with direct-current braking, aside from the herein-described power-plant control, is more particularly described and claimed in the aforesaid application of Maurice F. Jones; and an automatic catapult-controlling relay-system, for carrying out the shuttle-car control as herein described, is particularly described and claimed in an application of Ruel C. Jones, Serial No. 741,914, filed April 16, 1947, assigned to the Westinghouse Electric Corporation.

While I have shown and described my invention in a single illustrative form of embodiment, I wish it to be understood that the invention is not limited to the precise apparatus shown and described, as various equivalent component parts and arrangements may be substituted, without departing from the essence of my invention. I desire, therefore, that the appended claims shall be accorded the broadest interpretation consistent with their language.

I claim as my invention:

1. In combination, a direct-current generator, a direct-current motor constantly connected to said direct-current generator, an output-generator driven by said direct-current motor, said output-generator having a large flywheel-effect, a pilot-generator driven by said direct-current motor, said direct-current generator and said direct-current motor each having a field-winding circuit, including energizing-means therefor, including a regulator-controlled field-resistance, and a separate voltage-regulator for each regulator-controlled resistance, the regulator for the field-winding of the direct-current motor having a biasing means tending to cut out its regulator-controlled resistance and having a voltage-coil energized in response to the voltage supplied by the direct-current generator, and the regulator for the field-winding of the direct-current generator having a biasing means tending to cut out its regulator-controlled resistance and having a voltage-coil energized in response to the voltage supplied by the pilot-generator.

2. In combination, a direct-current generator, a direct-current motor constantly connected to said direct-current generator, an output-generator driven by said direct-current motor, said output-generator having a large flywheel-effect, a pilot-generator driven by said direct-current motor, said direct-current generator having a field-winding circuit, including energizing-means therefor, including a regulator-controlled field-resistance and a separately variable field-resistance, said direct-current motor having a field-winding circuit, including energizing-means therefor, including a regulator-controlled field-resistance, and a separate voltage-regulator for each regulator-controlled resistance, the regulator for the field-winding of the direct-current motor having a biasing means tending to cut out its regulator-controlled resistance and having a voltage-coil energized in response to the voltage supplied by the direct-current generator, and the regulator for the field-winding of the direct-current generator having a biasing means tending to cut out its regulator-controlled resistance and having a voltage-coil energized in response to the voltage supplied by the pilot-generator.

3. In combination, a direct-current generator, a direct-current motor constantly connected to said direct-current generator, an output-generator driven by said direct-current motor, said output-generator having a large flywheel-effect, a speed-responsive means, responsive to the speed of said direct-current motor, said direct-current generator and said direct-current motor each having a field-winding circuit, including energizing-means therefor, including a regulator-controlled field-resistance, and a separate voltage-regulator for each regulator-controlled resistance, the regulator for the field-winding of the direct-current motor having a biasing means tending to cut out its regulator-controlled resistance and having a voltage-coil energized in response to the voltage supplied by the direct-current generator, and the regulator for the field-winding of the direct-current generator having a biasing means tending to cut out its regulator-controlled resistance and having an actuating means responsive to said speed-responsive means.

4. In combinantion, a direct-current generator, a direct-current motor constantly connected to said direct-current generator, an output-generator driven by said direct-current motor, said output-generator having a large flywheel-effect, a speed-responsive means, responsive to the speed of said direct-current motor, said direct-current generator having a field-winding circuit, including energizing-means therefor, including a regulator-controlled field-resistance and a separately variable field-resistance, said direct-current motor having a field-winding circuit, including energizing means therefor, including a regulator-controlled field-resistance, and a separate voltage-regulator for each regulator-controlled resistance, the regulator for the field-winding of the direct-current motor having a biasing means tending to cut out its regulator-controlled resistance and having a voltage-coil energized in response to the voltage supplied by the direct-current generator, and the regulator for the field-winding of the direct-current generator having a biasing means tending to cut out its regulator-controlled resistance and having an actuating means responsive to said speed-responsive means.

5. In combination, a direct-current generator, a direct-current motor constantly connected to said direct-current generator, a load-shaft mechanically driven by said direct-current motor, said direct-current motor and its load shaft having a large flywheel-effect, a speed-responsive means, responsive to the speed of said direct-current motor, said direct-current generator and said direct-current motor each having a field-winding circuit, including energizing-means therefor, including a regulator-controlled field-resistance, and a separate voltage-regulator for each regulator-controlled resistance, the regulator for the field-winding of the direct-current motor having a biasing means tending to cut out its regulator-controlled resistance and having a voltage-coil energized in response to the voltage supplied by the direct-current generator, and the regulator for the field-winding of the direct-current generator having a biasing means tending to cut out its regulator-controlled resistance and having an actuating means responsive to said speed-responsive means.

EUGENE C. WHITNEY.

REFERENCES CITED

The following references are of record in the file of this patent:

UNITED STATES PATENTS

| Number | Name | Date |
| --- | --- | --- |
| 1,305,031 | Tirrill | May 27, 1919 |
| 1,699,024 | Schnitzer | Jan. 15, 1929 |
| 1,943,498 | Von Ohlser | Jan. 16, 1934 |